US008085796B2

(12) United States Patent
Kreiner et al.

(10) Patent No.: US 8,085,796 B2
(45) Date of Patent: *Dec. 27, 2011

(54) METHODS, SYSTEMS, AND PRODUCTS FOR VIRTUAL PERSONALIZED NETWORKS

(75) Inventors: Barrett Morris Kreiner, Norcross, GA (US); Donna K. Hodges, Cumming, GA (US); Jonathan M. Peterson, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 881 days.

This patent is subject to a terminal disclaimer.

(21) Appl. No.: 12/126,137

(22) Filed: May 23, 2008

(65) Prior Publication Data

US 2008/0232295 A1    Sep. 25, 2008

Related U.S. Application Data

(63) Continuation of application No. 10/306,504, filed on Nov. 27, 2002, now Pat. No. 7,379,464.

(51) Int. Cl.
*H04L 12/56* (2006.01)

(52) U.S. Cl. .................. 370/401; 709/203; 709/238

(58) Field of Classification Search .................. 370/401; 709/203, 238
See application file for complete search history.

(56) References Cited

U.S. PATENT DOCUMENTS

| 5,418,628 | A | 5/1995 | Perkins |
| 5,602,843 | A | 2/1997 | Gray |
| 5,924,074 | A | 7/1999 | Evans |
| 6,002,689 | A | 12/1999 | Christie |
| 6,016,307 | A | 1/2000 | Kaplan |
| 6,026,091 | A | 2/2000 | Christie |
| 6,052,442 | A | 4/2000 | Cooper |
| 6,098,138 | A | 8/2000 | Martinelli |
| 6,104,718 | A | 8/2000 | Christie |
| 6,129,449 | A | 10/2000 | McCain |
| 6,178,170 | B1 | 1/2001 | Duree |
| 6,181,703 | B1 | 1/2001 | Christie |
| 6,226,686 | B1 | 5/2001 | Rothschild |
| 6,305,007 | B1 | 10/2001 | Mintz |
| 6,385,198 | B1 | 5/2002 | Ofek |
| 6,434,403 | B1 | 8/2002 | Ausems |
| 6,456,594 | B1 | 9/2002 | Kaplan |
| 6,466,236 | B1 | 10/2002 | Pivowar |
| 6,810,429 | B1 | 10/2004 | Walsh |
| 6,973,479 | B2 * | 12/2005 | Brady et al. .................. 709/203 |
| 7,114,170 | B2 | 9/2006 | Harris |
| 7,114,171 | B2 * | 9/2006 | Brady et al. .................... 725/77 |
| 7,117,246 | B2 | 10/2006 | Christenson |
| 7,224,698 | B2 | 5/2007 | Kreiner |
| 7,379,464 | B2 * | 5/2008 | Kreiner et al. ................ 370/401 |
| 2002/0010758 | A1 | 1/2002 | Chan |

(Continued)

OTHER PUBLICATIONS

Software aims to put your life on a disk, New Scientist.com, Nov. 20, 2002.

*Primary Examiner* — Albert T Chou
(74) *Attorney, Agent, or Firm* — Scott P. Zimmerman PLLC

(57) ABSTRACT

Methods, systems, and apparatuses are disclosed for enabling a virtual personalized network. Communications are established with a personal digital gateway to control access, sharing, security, and/or management of up-to-date personalized data exchanged between or among a plurality of associated communications devices and/or communications networks. The associated communications devices are owned, operated, and/or accessed by a common user.

20 Claims, 10 Drawing Sheets

U.S. PATENT DOCUMENTS

| | | |
|---|---|---|
| 2002/0055917 A1 | 5/2002 | Muraca |
| 2002/0136223 A1 | 9/2002 | Ho |
| 2002/0188689 A1 | 12/2002 | Michael |
| 2004/0059598 A1 | 3/2004 | Wellons |
| 2004/0060056 A1 | 3/2004 | Wellons |
| 2004/0100974 A1* | 5/2004 | Kreiner et al. ............... 370/401 |
| 2004/0100975 A1 | 5/2004 | Kreiner |

* cited by examiner

METHODS, SYSTEMS, AND PRODUCTS FOR VIRTUAL PERSONALIZED NETWORKS

CROSS REFERENCE TO RELATED APPLICATIONS

This application is a continuation of U.S. application Ser. No. 10/306,504, filed Nov. 27, 2002, now issued as U.S. Pat. No. 7,379,464, and incorporated herein by reference in its entirety.

This application also relates to U.S. application Ser. No. 10/306,690, now issued as U.S. Pat. No. 7,224,698, and to U.S. application Ser. No. 10/306,848, now issued as U.S. Pat. No. 7,263,102, with both applications incorporated herein by reference in their entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to computer systems, communications, and communication devices. More particularly, this invention is directed to methods and systems for a personal digital gateway that communicates with a linked communications device to automatically provide customized presentation, selection, and management of programs and/or data to the linked communications device.

2. Description of the Related Art

Electronic communications has experienced explosive growth, and more growth is planned as access increases and communications devices improve. This explosive growth is revolutionizing how people manage data shared among numerous communications devices. Each week, hundreds, if not thousands or more, of electronic documents, facsimiles, emails, and other proprietary data may be generated by or provided to a user (e.g., owner or operator of the communications device). The user may desire to have this data available on multiple communications devices, such as, for example, the user's personal digital assistant (PDA), the user's home personal computer (PC), the user's office PC, and the user's wireless telephone. Typically, each of these communications devices is customized in terms of software, hardware, and network configuration. For example, the wireless telephone and the home PC have different software applications, data processing, storage, management, and communications systems.

One of the biggest barriers to managing multiple communications devices is creating, accessing, and maintaining up-to-date personalized information. This personalized information can be exchanged or otherwise shared with each of the user's communications devices. For example, if the user wants to share contact information (e.g., name, phone numbers, addresses, etc.) between the wireless telephone and the home PC, then the user typically must enter this information twice—once on the wireless telephone and once on the home PC. If the user updates the contact information for his/her home PC, then this updated information is not communicated to the wireless phone and the user must update the wireless phone separately. Another barrier is providing this up-to-date personalized information in a standardized or otherwise compatible data format, depending on functionality limitations of the communications device, so that each of the communications devices has efficient and effective access to the information. For example, conventional wireless phones have limited functionality compared with the home PC. Typically, wireless telephones provide limited contact information, such as a telephone listing by name rather than full address books and/or calendars. Additionally, conventional wireless telephones are unable to run application/software packages and may have limited capabilities for transmitting, receiving, and displaying video data.

In addition to the above challenges, some communications devices of the user also set forth a variety of login identifications and/or passwords in order to provide privacy, authorization, and/or security for the communications device and/or the connected communications networks. For example, the wireless phone may have a security identifier that activates service over the wireless network. In addition, the wireless phone may have another security identifier that accesses a voice messaging service. Typically, these identifiers are created and managed by the user. However, in some instance, such as accessing the user's office PC, the user may not have control over creating and managing identifiers and passwords.

The above discussion illustrates how the sharing of up-to-date personalized information among various communications devices is creating a new foundation for a virtual personalized network setting. With this emerging virtual personalized network setting, what is needed is a personalized digital gateway that builds communications infrastructures to support and capitalize on the different communications devices of the user to provide up-to-date personalized information. Accordingly, personal digital gateway (PDG) information systems and components are needed that enable multiple communications devices to share, transfer, and/or access standardized or otherwise compatible up-to-date personalized information. Additionally, personal digital gateway systems and components are needed to customize presentation of the standardized up-to-date personalized information based on the functionalities of each communications device. Further, a need exists to improve notification, access, and management of the personalized information without investing millions of dollars in computer equipment, in networking infrastructures, in maintenance, and in training while also complying with security, authentication, and/or privacy requirements.

BRIEF SUMMARY OF THE INVENTION

The aforementioned problems and others are reduced by a personal digital gateway (PDG). This PDG provides an interface between different communications devices, networks, and systems, and, thereby, provides universal access to and management of personalized information across a variety of communications devices of the user. The PDG comprises systems and methods that leverage the assets of a connected communications device and associated networks to facilitate improved access, sharing, notification, security, and/or management of data exchanged between or among different communications devices. Some advantages of the PDG include increased ability of each connected communications device to flexibly manage and categorize data that is exchanged with other communications devices, provide access to up-to-date data (including user preferences, passwords, and messages), and utilize a virtual personalized network to manage communications with connected networks, such as a public data network (e.g., Internet).

An embodiment of this invention describes a method of selecting a communications device from a plurality of communications devices to communicate data between a personal digital gateway and a selected communications device, interpreting the data according to a rule-based engine, processing the data, and communicating the data. Typically, the data is associated with a common user of the PDG and of the selected communications device. The step of processing the data includes configuring the data for a presentation format compatible with the selected communications device. Additionally, the data may be authenticated and verified for security purposes to ensure adequate identification by the user and secure communications between the personal digital gateway and the selected communications device. Thereafter, the data may be presented by the selected communications device so that the user has access to and management of the data including the ability to update the data. Alternatively, the PDG may present the data. For example, if the PDG is trying to communicate an address book including names, phone numbers, addresses, and maps to a mobile phone, then the functionality of the mobile phone may limit the display (e.g., limited screen size or pixel size to present the address book) and the user may use a graphical user interface of the PDG to alternatively view the data.

The data is interpreted according to a rule-based engine that categorizes: (1) data associated with an access agent, (2) data associated with a configuration agent, (3) data associated with a security agent, and (4) data associated with a management agent. For example, data associated with the configuration agent may include information about hardware, software, and network configuration (including user preferences) of the selected communications device. In a preferred embodiment, a rule-based application dataserver is used to run the rule-based engine. The rule-based application dataserver allows the user to control access, sharing, notification, security, and/or management of the data exchanged with the selected communications device via a PDG rule-based profile associated with the above categories. In an embodiment, the rule-based application dataserver is provided by the personal digital gateway. In other embodiments, the rule-based application dataserver may be associated with the selected communications device and/or network equipment of the selected communications device, such as a personal computer with a modem connection to a central office (CO) of a telecommunications network.

Another embodiment describes a method for communicating the data to a rule-based application dataserver associated with the personal digital gateway and allowing a user to manage the rule-based application dataserver including one or more databases associated with the PDG rule-based profile. Alternatively, the rule-based application dataserver may be provided by the selected communications device and/or connected network. For example, a telecommunications service provider could provide access to a remote rule-based dataserver associated with the personal digital gateway via a modem connection with a personal computer. Thus, the user could remotely manage the data shared across numerous communications devices.

Still another embodiment describes a method of establishing a data connection between the personal digital gateway and the communications device and communicating the data via the data connection.

BRIEF DESCRIPTION OF THE SEVERAL VIEWS OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

Figure 1:
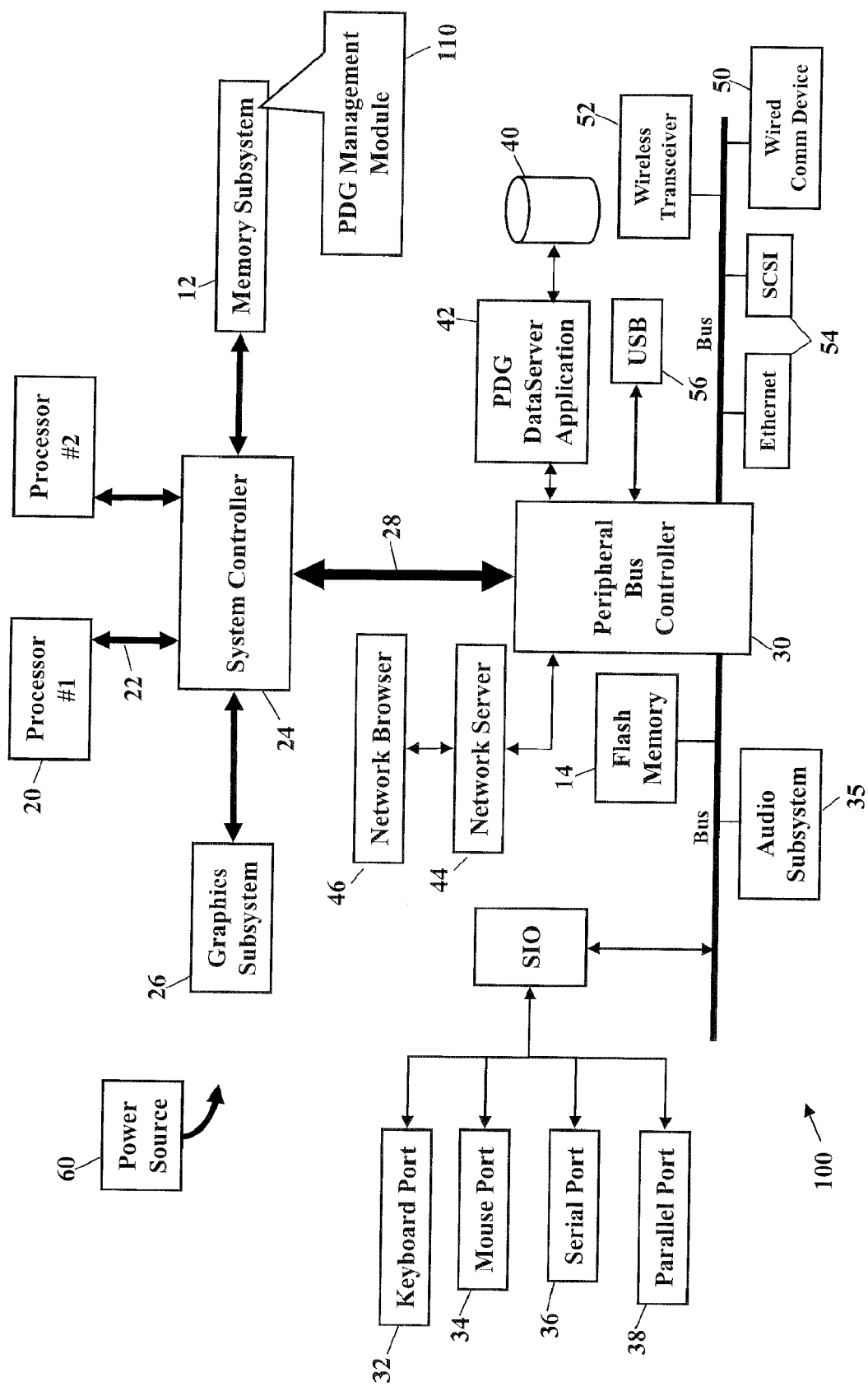
FIG. 1 is a block diagram showing of an exemplary Personal Digital Gateway (PDG) according to an embodiment of this invention.

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, flowcharts, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

A personal digital gateway is a device that interfaces different communications devices, connected networks, and/or systems. The purpose of the personal digital gateway is to efficiently automate configuration and routing of data to different communications devices of a common user and to effectively manage this data and the different communications devices. The personal digital gateway leverages the assets of the connected communications device(s) in terms optimally using the connected software, hardware, equipment, networks, and/or other information technology assets. For example, the user's office PC may have a local and/or a wide area network that utilizes Ethernet, dedicated private lines, Frame Relay, ISDN, ATM, ADSL, and the like to provide a high speed connection to a data network, such as the Internet, Intranet, and/or Extranet. Some advantages of the PDG include increased ability of each connected communications device to flexibly manage and categorize data that is exchanged with other communications devices, provide access to up-to-date data (including user preferences, passwords, and messages), and utilize a virtual personalized network to manage communications with connected networks, such as the Internet.

As used herein, the term "communications device" includes wired and wireless communications devices, such as a mobile phone, a wireless phone, a Wireless Access Protocol (WAP) phone, a satellite phone a computer, a modem, a pager, a digital music device, a digital recording device, a personal digital assistant, an interactive television, a digital signal processor, and/or a Global Positioning System device. Additionally, the term "communications device" may include a bar code reader, digital read-out equipment, and/or programmable appliances (e.g., ovens, refrigerators, washers, and other appliances, answering machines, alarm systems, etc.). Further, as used herein, the term "data" includes electronic information, such as, for example facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, such as a grouping of emails associated with the user's personal Internet Service Provider and with the user's business electronic messaging system, and/or (4) profiles associated with configuration, authenticity, security, and others. In various embodiments, the data may be stored by the PDG, a peripheral storage device connected to the PDG, the selected communications device, a network connected with the selected communication device, and/or other connected networks. Thus, the PDG provides a virtual personalized network of universal data controlled by the user.

Referring now to the figures, FIG. 1 is a block diagram showing a PDG Management Module 110 residing in a personal digital gateway 100. The PDG Management Module 110 operates within a system memory device. The PDG Management Module 110, for example, is shown residing in a memory subsystem 12. The PDG Management Module 110, however, could also reside in flash memory 14 and/or in a peripheral storage device, such as storage device 40 associated with a PDG rule-based dataserver 42. The personal digital gateway 100 also has one or more central processors 20 executing an operating system. The operating system, as is well known, has a set of instructions that control the internal functions of the personal digital gateway 100. A system bus 22 communicates signals, such as data signals, control signals, and address signals, between the central processors 20 and a system controller 24 (typically called a "Northbridge"). The system controller 24 provides a bridging function between the one or more central processors 20, a graphics subsystem 26, the memory subsystem 12, and a PCI (Peripheral Controller Interface) bus 28. The PCI bus 28 is controlled by a Peripheral Bus Controller 30. The Peripheral Bus Controller 30 (typically called a "Southbridge") is an integrated circuit that serves as an input/output hub for various peripheral ports. These peripheral ports could include, for example, a keyboard port 32, a mouse port 34, a serial port 36 and/or a parallel port 38. Additionally, these peripheral ports would allow the personal digital gateway to communicate with a variety of communications devices through ports 54 (such as SCSI or Ethernet), Wireless Transceiver 52 (using the IEEE Wireless standard 802.11 and Infrared), and Wired Comm Device Port 50 (such as modem V90+ and compact flash slots). The Peripheral Bus Controller 30 could also include an audio subsystem 35. Additionally, the personal digital gateway may include a network server 44 operating with a network browser 46. The network server 44 and the network browser 46 may be stand alone components or they may be integrated into the PDG dataserver 42. Still further, the personal digital gateway 100 may include a power source 60, such as a rechargeable battery to provide power and allow the personal digital gateway 100 to be portable. The processor 20 is typically a microprocessor. Advanced Micro Devices, Inc., for example, manufactures a full line of microprocessors, such as the ATHLON™ (ATHLON™ is a trademark of Advanced Micro Devices, Inc., One AMD Place, P.O. Box 3453, Sunnyvale, Calif. 94088-3453, 408.732.2400, 800.538.8450, www.amd.com). Sun Microsystems also designs and manufactures microprocessors (Sun Microsystems, Inc., 901 San Antonio Road, Palo Alto Calif. 94303, www.sun.com). The Intel Corporation manufactures microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com).

The preferred operating system is a LINUX® or a RED HAT® LINUX-based system (LINUX® is a registered trademark of Linus Torvalds and RED HAT® is a registered trademark of Red Hat, Inc., Research Triangle Park, N.C., 1-888-733-4281, www.redhat.com). Other operating systems, however, may be suitable. Such other operating systems would include a UNIX®-based system (UNIX® is a registered trademark of The Open Group, 44 Montgomery Street, Suite 960, San Francisco, Calif. 94104, 415.374.8280, www.opengroup.org). and Mac® OS (Mac® is a registered trademark of Apple Computer, Inc., 1 Infinite Loop, Cupertino, Calif. 95014, 408.996.1010, www.apple.com). Another operating system would include DOS-based systems. WINDOWS® and WINDOWS NT® are common examples of DOS-based systems (WINDOWS® and WINDOWS NT® are registered trademarks of Microsoft Corporation, One Microsoft Way, Redmond Wash. 98052-6399, 425.882.8080, www.Microsoft.com).

The system memory device (shown as memory subsystem 12, flash memory 14, or peripheral storage device 40) may also contain one or more application programs. For example, an application program may cooperate with the operating system and with a video display unit (via the serial port 36 and/or the parallel port 38) to provide a Graphical User Interface (GUI) for the PDG Management Module 110. The GUI typically includes a combination of signals communicated along the keyboard port 32 and the mouse port 34. The GUI provides a convenient visual and/or audible interface with the user of the personal digital gateway 100. As is apparent to those of ordinary skill in the art, the selection and arrangement of the PDG Management Module 110 may be programmed over a variety of alternate mediums, such as, for example, a voice-activated menu prompt.

Figure 2:
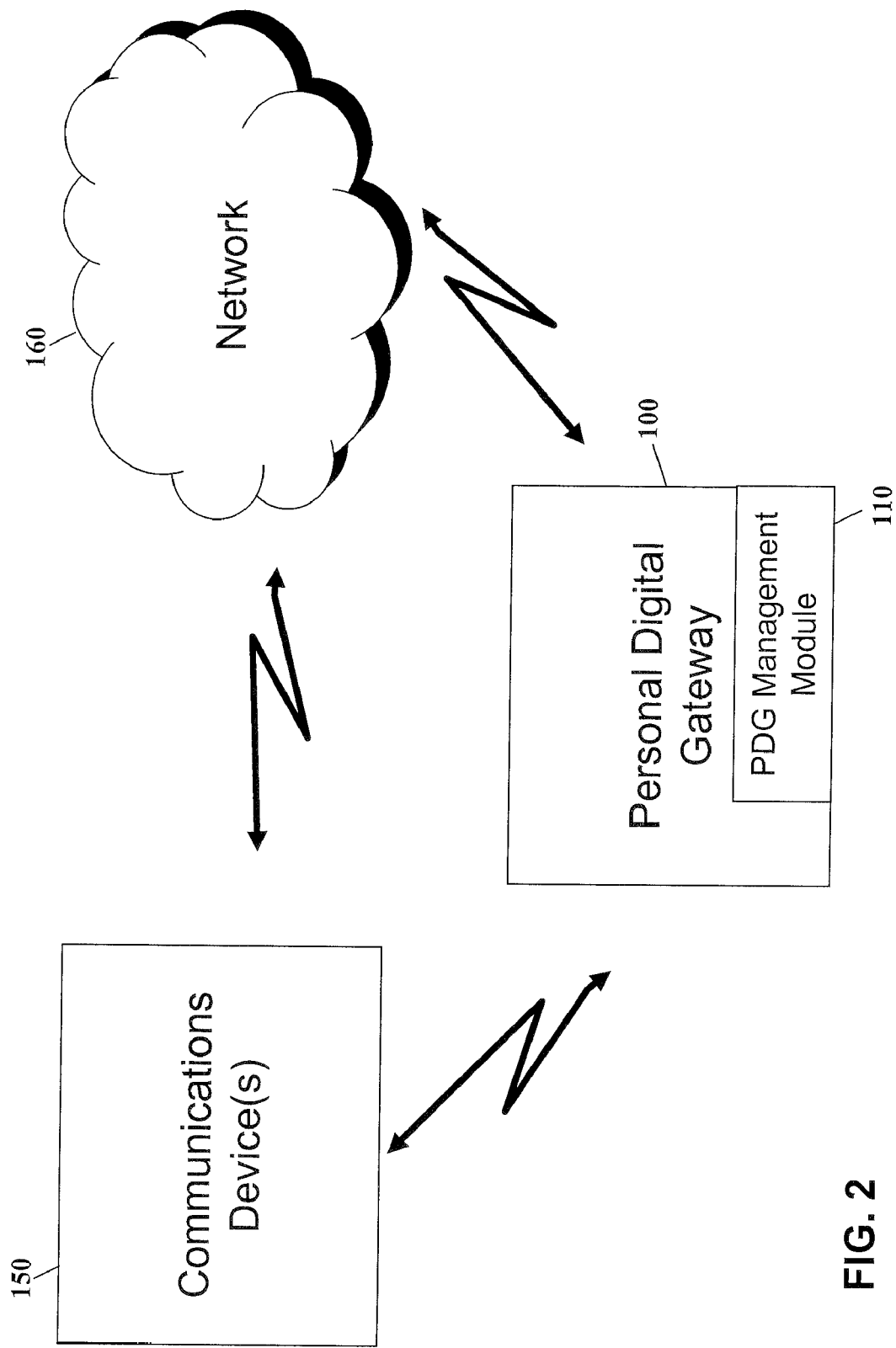
FIG. 2 is a schematic showing an exemplary operating environment for a PDG according to an embodiment of this invention.
Figure 3:
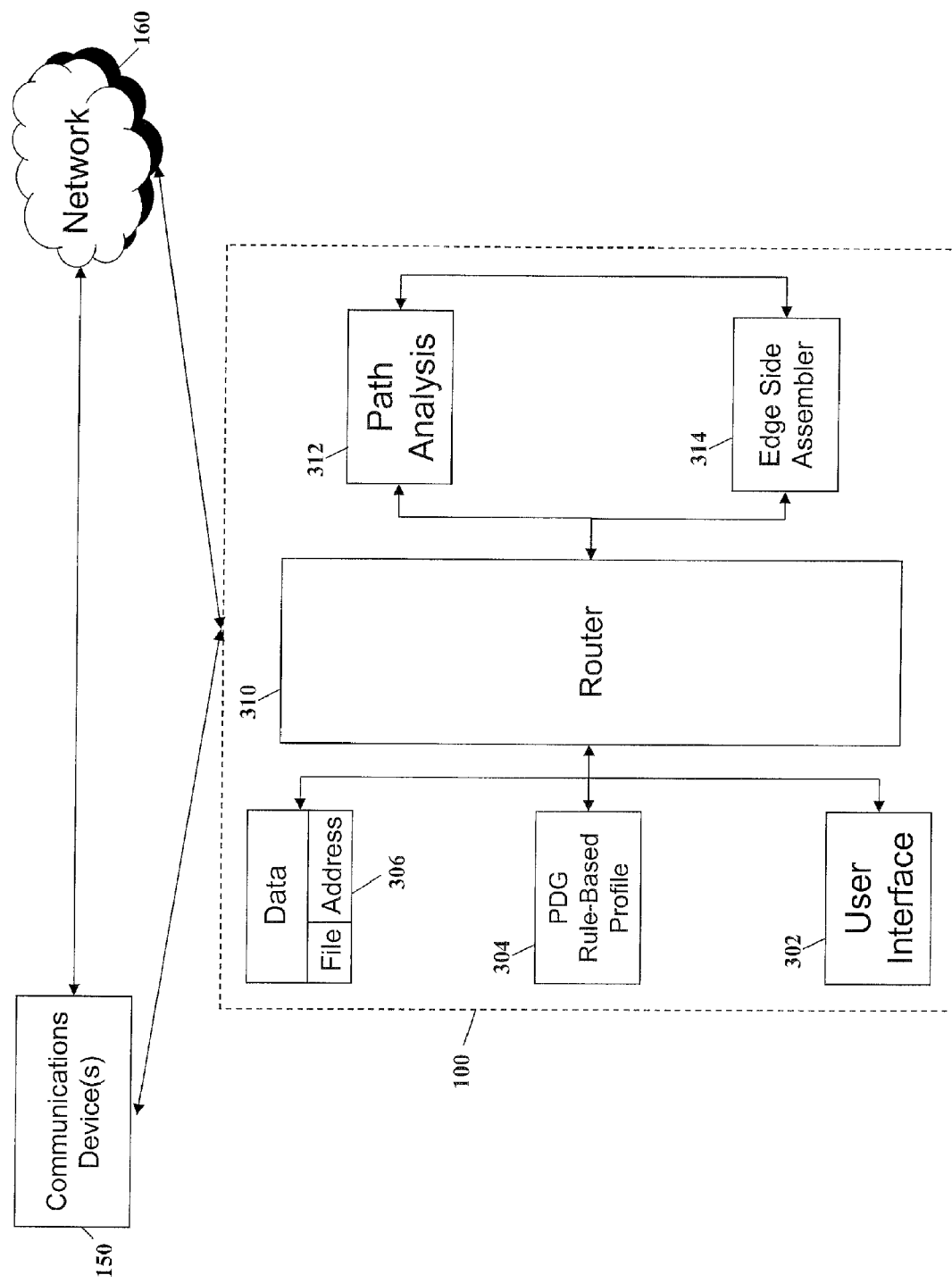
FIG. 3 is a functional block diagram showing an exemplary PDG connected with a communications device and associated network according to an embodiment of this invention.

FIG. 2 is an exemplary operating environment that illustrates the personal digital gateway 100 communicating with a communications device 150 and with a network 160. The communications device 150 and the network 160 may also communicate with each other (e.g., Office PC shown as reference numeral 603 and shared, interconnected network 670 of FIG. 6). FIG. 3 shows another exemplary operating environment with additional details of how the user may interact with a User Interface 302 to select a PDG Rule-Based Profile 304 and/or the data 306 to communicate with the communications device 150 and/or network 160. A router 310 of the personal digital gateway 100 chooses a communications path 312 and an Edge Side Assembler 314 accesses, integrates, and configures the data 306 (including remote data that is stored within the communications device 150 and/or network 160) to communicate with the communications device 150 (or, alternatively, with the personal digital gateway 100). While FIG. 3 shows the personal digital gateway 100 comprising the User Interface 302, the PDG Rule-Based Profile 304, the data 306, the router 310, the communications path analyzer 312, and the Edge Side Assembler 314, each may be separate components. The router 310, for example, may be a stand-alone component communicating with the other components.

The PDG Management Module 110 of the personal digital gateway 100 allows a user to manage protocol transfer across a variety of communications devices and networks and to manage communications of mobile data associated with the personal digital gateway 100. For example, PDG Management Module 110 allows: (1) the user to customize one or more PDG rule-based profiles 304 of a rule-based application dataserver (shown as reference numeral 42 in FIG. 1) including a configuration agent (e.g., MyCommController), a security agent (e.g., MyCredentials), an access agent (e.g., MyProfile), a management agent (e.g., MyPDGTools), and data associated with the common user (e.g., MyMobileInfo); (2) the user to customize presentation, features, and/or management of communications between the personal digital gateway 100 and the communications device 150; and (3) the user to manage network connection(s) of the personal digital gateway 100 and/or the communications device 150. For example, the user may select a configuration agent (MyCommController) having a list of communications devices (e.g., personal digital assistant, mobile phone, home PC, office PC, MP3 player, etc.) and add to, delete from, and/or modify the configuration profile of the communications device, such as, connectivity parameters and device functionality parameters (e.g., capability to present audio or video and capability to run portable applications). This information is stored with the PDG Rule-Based Profile 304 of the connected communications device 150 and may act as a trigger for routing, configuring, and formatting communications including data 306 associated with the rule-based application dataserver 42. The PDG Management Module 110 also allows the user to customize features, such as data handling options. For example, the PDG Management Module 110 may split a display screen of the selected communications device (and/or personal digital gateway 100) into two viewing areas and present the management controls (e.g., access agent, security agent, etc.) in one portion and present the data that has been or that might be integrated for communications between the personal digital gateway 100 and the connected communications device 150 in the other portion. Further, the PDG Management Module 110 may allow the user to control whether to accept, decline, or postpone integration of the data with the connected communications device 150, or alternatively, may be set to automatically accept, decline, or postpone integration depending on rules contained in the PDG rule-based profile 304. Still further, the PDG Management Module 110 of the personal digital gateway 100 allows a user to control additional processing of the data, such as editing the data, copying the data, deleting the data, associating the data with remote data, links, and otherwise related data linking the data, storing the data, administering the data, compressing the data, and uncompressing the data (via MyPDGTools) and encrypting/decrypting the data (via MyCredentials). Finally, the PDG Management Module 110 of the personal digital gateway 100 may provide a network address, such as an IP address or the like, of the connected communications device 150 so that a connected network 160, such as a telecommunications network and/or a data network, can communicate the data (e.g., remote data and/or linked data) and, thus integrate telephony events and data network events with the user's connected communications device 150.

The PDG Rule-Based DataServer Application 42 (also referred to herein as the "PDG DataServer") functions as an intelligent server, database, and processor that is dedicated to managing personal digital gateway activity including communications with the connected communications device 150 and/or the connected network 160. The PDG DataServer 42 stores one or more PDG Rule-Based Profiles 304 that include data and/or applications associated with various agents, including MyCommController, MyCredentials, MyProfile, MyPDGTools, and/or a troubleshooting agent. For example, MyCredentials may contain a variety of fields and/or files associated with at least one of the following: login information associated with the user, password associated with the user, telephone number and/or Service Node of the user, TCP/IP address of the user, other addresses and passwords associated with a communications device and/or network of the user, and encryption/decryption tools. Still another example includes MyCommController that may contain a variety of fields and/or files associated with presentation formats for various communications devices and other information associated with the communications signal, size, and content of data, display of a GUI (e.g., color, font, placement of PDG Management Module 110 on screen, etc.), and other selections related to PDG management, such as routing and troubleshooting problems or error messages.

Figure 4:
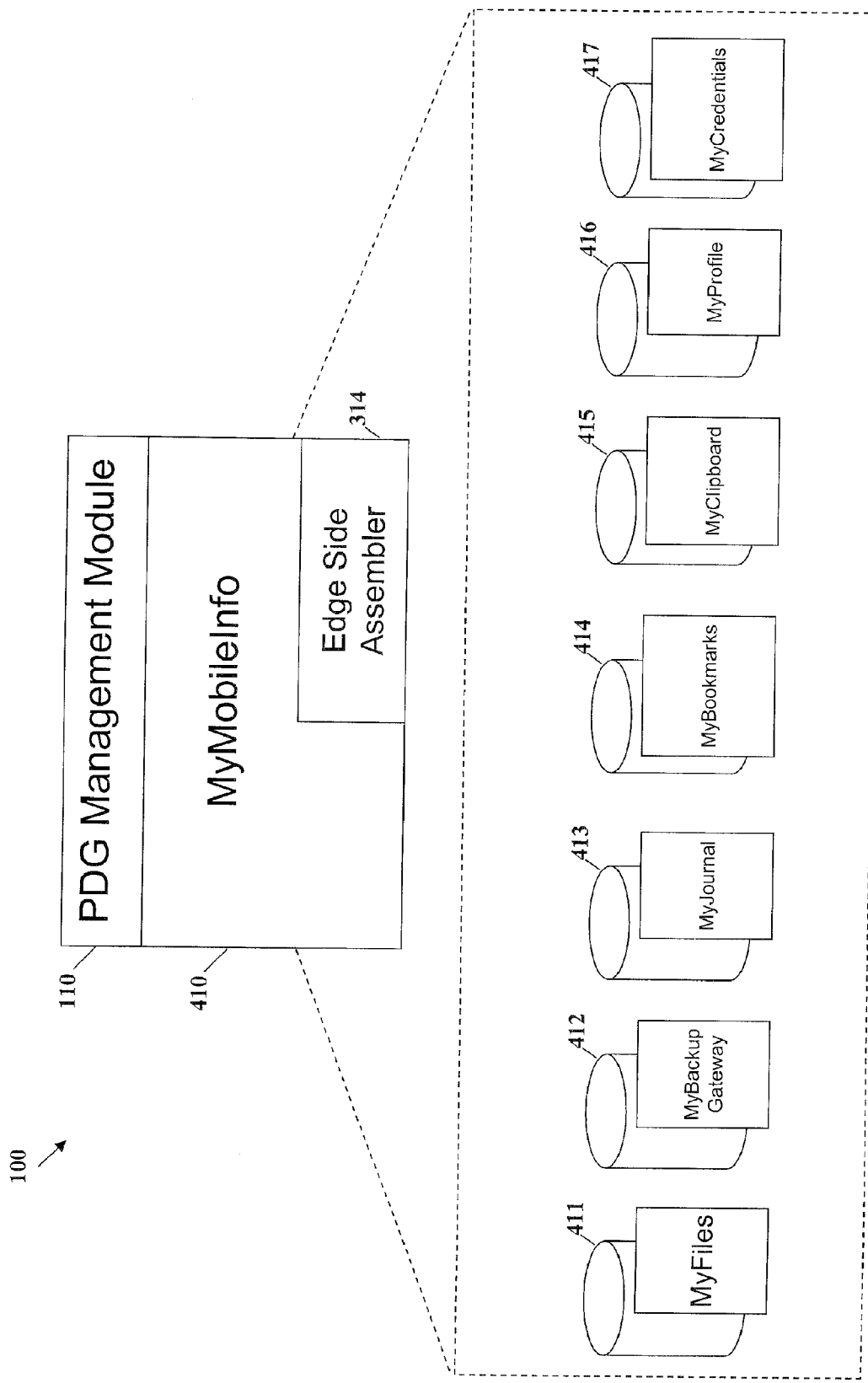
FIG. 4 is a more detailed schematic for MyMobileInfo of the PDG Management Module of FIG. 1 according to an embodiment of this invention.

FIG. 4 illustrates a more detailed schematic of the MyMobileInfo engine 410 that provides rules and databases for creating, accessing, sharing, and/or otherwise managing the data 306 communicated to the connected communications device 150 and/or the connected network 160. The MyMobileInfo engine contains rules associated with and databases for (1) file storage of mobile data (i.e., MyFiles), (2) file storage backup (i.e., MyBackupGateway), (3) personal journal storage (i.e., MyJournal), (4) bookmarks, cookies, caches, and other networked links (i.e., MyBookmarks), (5) copy and paste features (i.e., MyClipboard), (6) personal profiles and preferences, such groupings, categories, timing sequences to automatically refresh linked sites, etc. (i.e., MyProfile), and (7) identification, authentication, and security credentials for associated communications devices and/or networks, such as username, password, etc. (i.e., MyCredentials).

Additionally, the PDG Rule-Based Profile 304 may contain information from other engines. For example, MyCommController engine provides rules and databases for creating, accessing, and/or otherwise managing communications with associated communications devices that can be connected with the personal digital gateway 100. MyCommController maintains information about each communications device, such as communications medium (e.g., via Infrared connection, USB connection, the family of IEEE 802.11 standards, etc.) and network routing. For example, network routing provides a virtual private router that tunnels the user's network access to any communications device connected with the personal digital gateway 100. Still further, the PDG Management Module 110 may contain another engine, MyPersonalContentDistributor, that provides rules and databases for creating, sharing, and/or otherwise managing data that can be distributed through the connected communications device 150 and/or the network 160. For example, in an embodiment, when data associated with a work file co-authored with other individuals is updated, a mail message with the attached updated file is generated and sent to co-authors. The user may confirm sending the generated message, or alternatively, the message may be automatically sent using routing instructions. Still another example according to another embodiment includes sending a query to a list of contacts whenever a picture is uploaded or otherwise detected by the personal digital gateway 100. The query may be sent as an email to advise contacts of the picture and ask if the contact would like a copy. If so, the contact can select a link contained in the email and download a copy of the picture. Additionally, the contact may be charged an automatic fee that is programmed with the downloading of the picture and the fee may be communicated back to and accounted for by the personal digital gateway 100 or the communications device 150.

Figure 5:
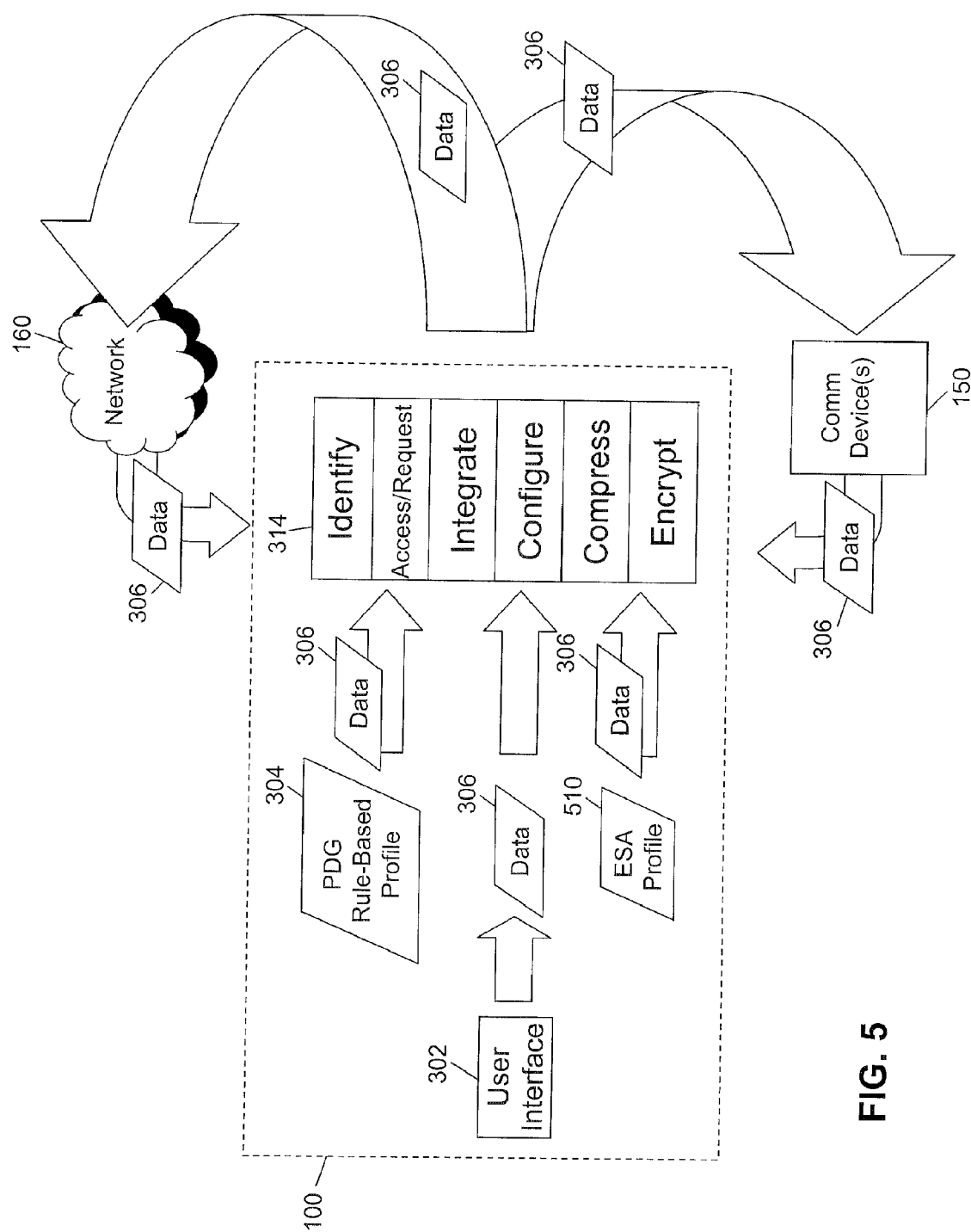
FIG. 5 is a schematic showing an exemplary configuration of the data flow through a PDG, a connected communications device, and/or a connected network according to an embodiment of this invention.

FIG. 5 is a schematic illustrating an exemplary framework of the data flow through a PDG, a connected communications device, and/or a connected network according to an embodiment of this invention. The user (not shown) of the personal digital gateway 100 may use the User Interface 302 to input and/or otherwise identify data 306 (e.g., inserting a compact disc of data into a locally connected storage device, such as reference numeral 710 in FIG. 7 or inputting an address, such as a domain name into a network browser). Thereafter, the user may select the PDG Rule-Based Profile 304 to associate, or alternatively, the personal digital gateway may automatically associate the Rule-Based Profile 304 (such as when MyProximityDetector identifies the communications device 150 within a selected proximity and initiates communications). The PDG Rule-Based Profile 304 and the data 306 are processed by the Edge Side Assembler 314. The Edge Side Assembler 314 identifies the data 306 (including data 306 associated with the PDG Rule-Based Profile 304), locates remote data, and associates the Edge Side Assembly profile (510) (if available). Next, the Edge Side Assembler 314 configures a query for remote data 306, accesses the communications device 150 and/or the network 160 to execute the query, receives the remote data 306, and integrates the remote data 306 with data 306 associated with the PDG Rule-Based Profile 304 and/or ESA Profile 410. Thereafter, the Edge Side Assembler 314 formats/configures the integrated data 306 for a presentation by the communications device 150, or alternatively, by the personal digital gateway. Additionally, the Edge Side Assembler 314 may compress and/or decompress data 306 communicated with the communications device 150, the network 160, and the personal digital gateway (e.g., local storage device 710 shown in FIG. 7). Still further, the Edge Side Assembler may encrypt and/or decrypt data 306 communicated with the communications device 150, the network 160, and the personal digital gateway.

Figure 6:
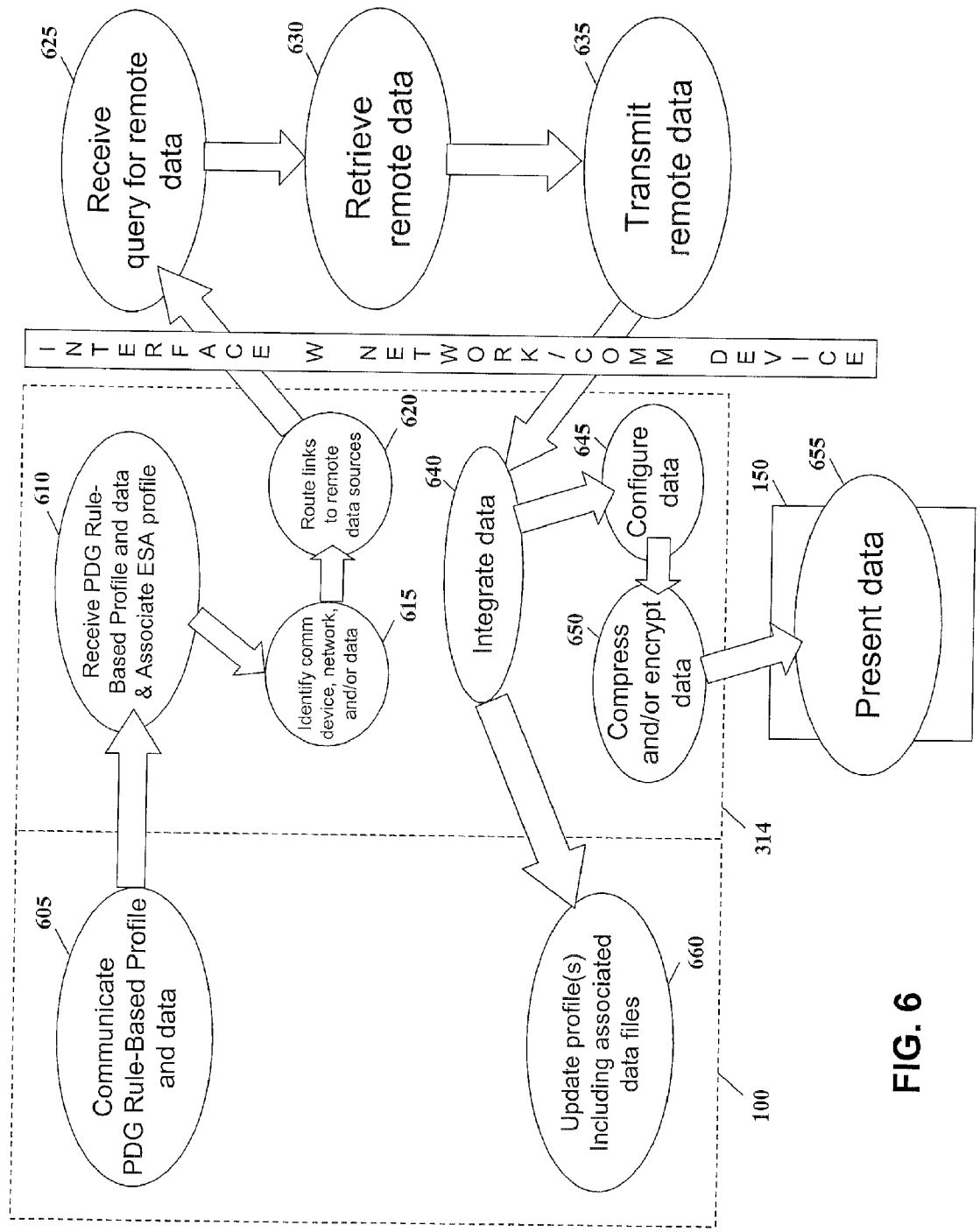
FIG. 6 is a flow diagram illustrating the flow of data through a PDG, a connected communications device, and a network according to an embodiment of this invention.

FIG. 6 is an exemplary flow diagram of the flow of the data 306 through the personal digital gateway 100, communications device 150, and/or network 160. Typically, the flow of the data 306 involves the user using the personal digital gateway 100 to communicate the PDG Rule-Based Profile 304 and/or data 306 (including locally stored data and associated remote and/or linked data) (step 605). The PDG Rule-Based Profile 304 and data 306 are routed to and received by the communications device 150 and, if applicable, the ESA profile 410 associates additional data (step 610). The Edge Side Assembler 314 determines whether external network(s) 160 and/or communications devices 150 need to be queried for remote data 306 and/or for refreshing linked data 306 (step 615). If so, the Edge Side Assembler 314 establishes communications with the network 160 and/or communications device 150 and routes a query to retrieve the remote and/or linked data 306 (step 620). The network 160 and/or communications device 150 receives the query (step 625), retrieves the data (step 630), and transmits the data 306 to the personal digital gateway 100 150 (step 635). Thereafter, the personal digital gateway 100 receives, integrates (step 640), and configures (step 645) the data (including remote and linked data) 306 for compatible exchange with the personal digital gateway 100, the connected communications device 150, and/or the connected network 160. Additionally, the data 306 may be compressed and/or encrypted (step 650) and presented to the communications device 150 (step 655). Typically, the Edge Side Assembler 314 is integrated into the personal digital gateway 100. Alternatively, the Edge Side Assembler 314 may be a stand alone system (not shown in the figures), may be integrated into a connected communications device 150, and/or may be integrated into the network 160. No matter how the Edge Side Assembler 314 is deployed, the data 306 is integrated and processed so that it is compatible for presentation by the communications device 150 (step 445) (or alternatively, by the personal digital gateway 100 (not shown)). Thereafter, the PDG Rule-Based Profile 304, ESA profile 410, and/or data 306 (e.g., associated data files stored on local storage device 710 shown in FIG. 6) may be updated (step 660). For example, in an embodiment, the PDG Rule-Based Profile 304 may contain rules for refreshing a bookmark associated with a connected network such that a collection of bookmarks are stored over time that show a specific version of the data associated with the bookmark and a date stamp. While the process in FIG. 6 is generally shown in series, the process may occur in different orders and/or at simultaneous times as one of ordinary skill in the art will understand.

Figure 7:
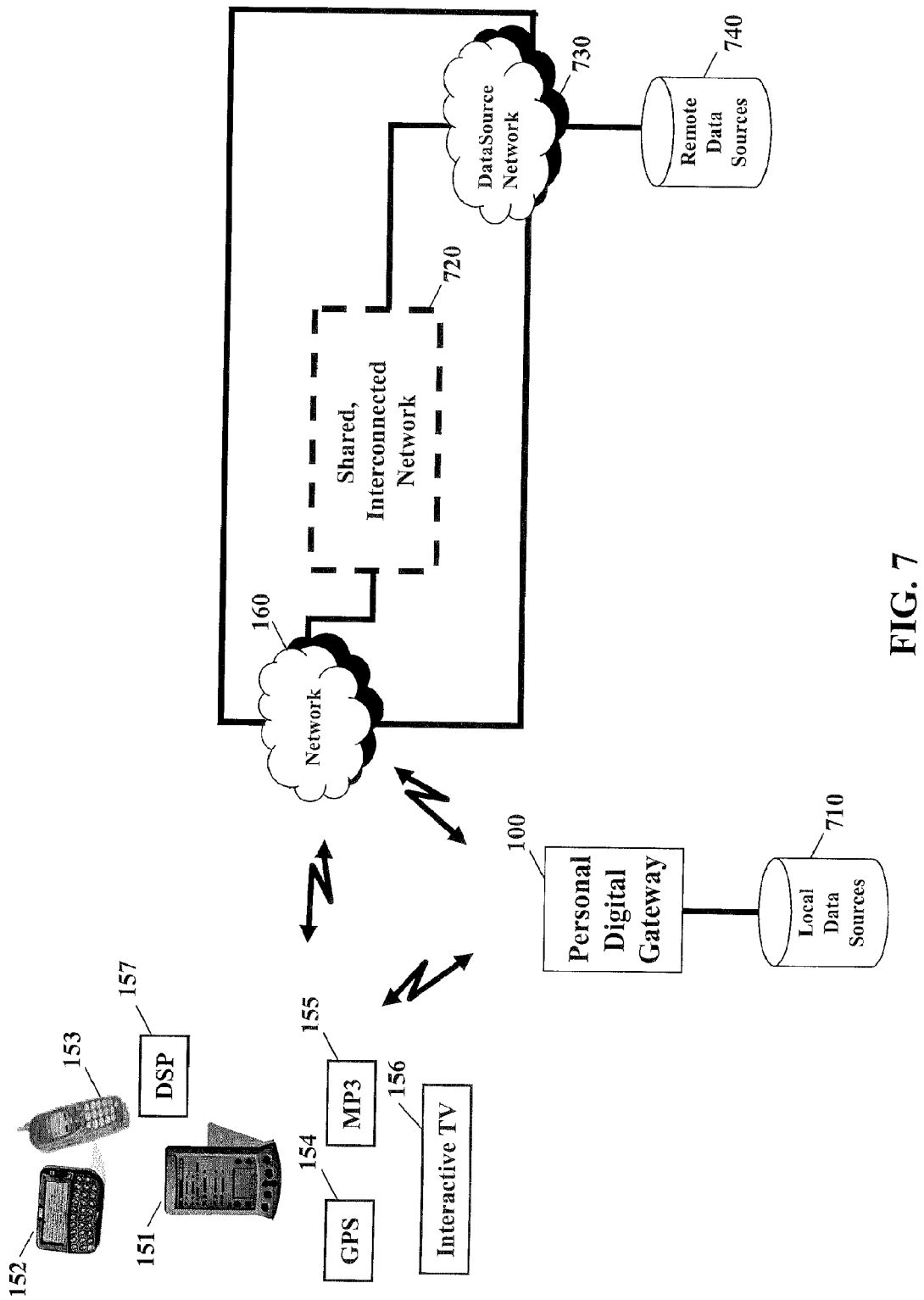
FIG. 7 is a schematic showing an exemplary embodiment of a PDG, a plurality of communications devices, and at least one network communicating data according to an embodiment of this invention.
Figure 8:
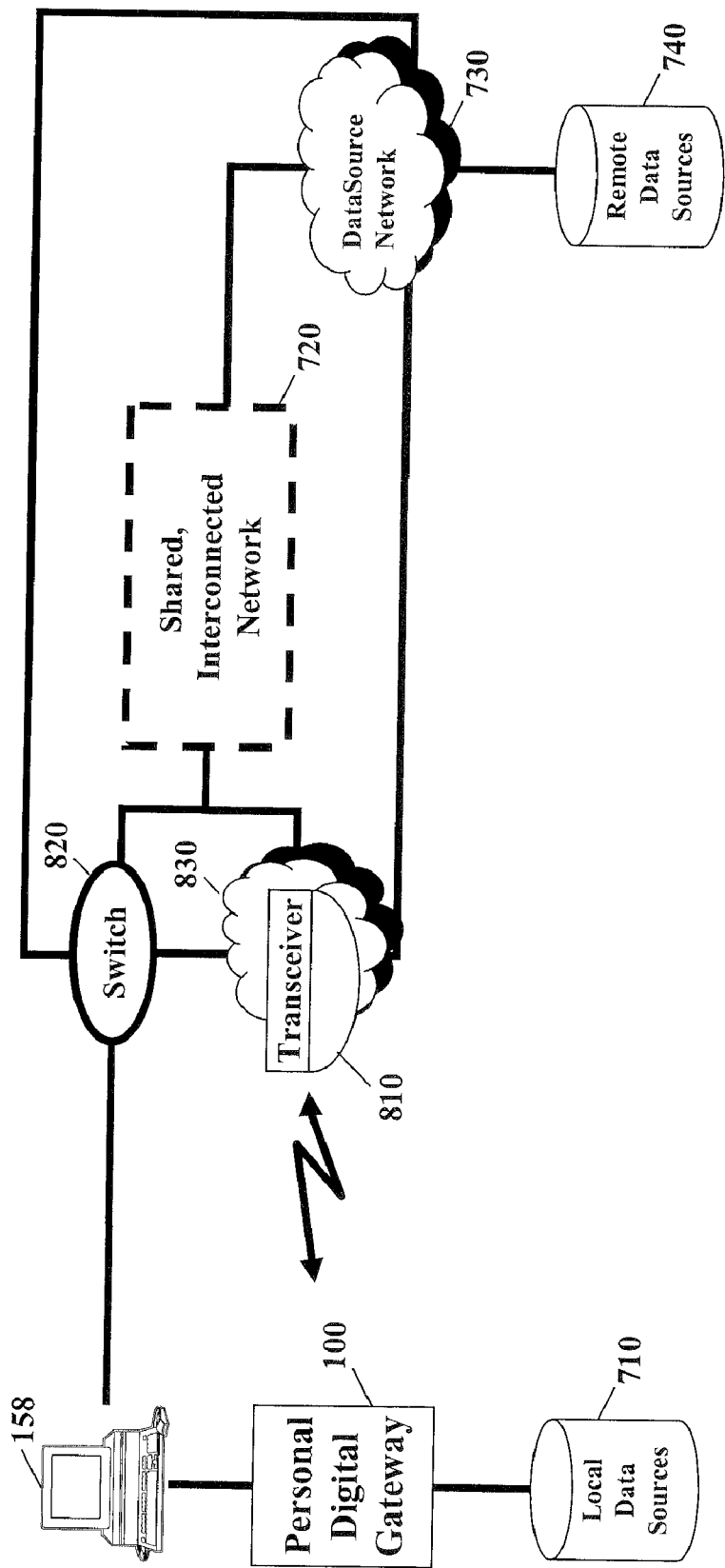
FIG. 8 is a schematic showing another exemplary embodiment of a PDG, a wired communications device, and at least one network communicating data according to an embodiment of this invention.

FIGS. 7-8 are schematics showing the personal digital gateway 100 communicating with a variety of wireless and wired communications devices (shown as reference numerals 151-157 in FIG. 7 and reference numeral 158 in FIG. 8) according to other embodiments of this invention. The means of communicating the data between the personal digital gateway 100 and the communications device include a variety of means, including optical transmission of data (e.g., any medium capable of optically transmitting the data), wireless transmission of data (e.g., wireless communications of the data using any portion of the electromagnetic spectrum), and/or fixed-wire transmission of data (e.g., any medium capable of transmitting electrons along a conductor). Fiber optic technologies, spectrum multiplexing (such as Dense Wave Division Multiplexing), Ethernet and Gigabit Ethernet services, Infrared, Wireless 802.11, and Digital Subscriber Lines (DSL) are just some examples of the transmission means.

FIG. 7 illustrates a virtual personalized network system that includes the personal digital gateway 100 coupled with a local storage device 710, a variety of communications devices that include a personal digital assistant (PDA) 151, interactive pager 152, an IP wireless phone 153, an a global positioning system transceiver 154, an MP3 player 155, an interactive television 156, a digital signal processor (DSP) 157, a communications device network 160, a shared, interconnected network 720, and a datasource network 730 coupled with a remote storage device 740. In an embodiment, the personal digital gateway 100 communicates with one of the variety of communications devices. For example, the personal digital gateway may communicate with the PDA 151 to communicate data stored on the local data storage device 710 and data stored on the remote data storage device 740. Although not shown, the PDA 151 communicates via an antenna communicating with a Mobile Telephone Switching Office (MTSO) that transmits a request for the remote and/or linked data through the communications device network 160. The communications device network 160 routes the request for the remote and/or linked data through the shared, interconnected network 720 to access the datasource network 730. The datasource network receives the request and transmits the remote and/or linked data back through the communications path to the PDA 151.

FIG. 8 illustrates another embodiment of a virtual personalized network system that includes the personal digital gateway 100 coupled with a local storage device 710, a personal computer (PC) 158, a transceiver 810, a transceiver network 830, a switch 820, a shared, interconnected network 720, and a datasource network 730 coupled with a remote storage device 740. PC 158 may be coupled with the switch 820 (e.g., via a modem or DSL connection (not shown)) to access the shared, interconnected network 720 and communicate the data 306. Alternatively, the personal digital gateway 100 may communicate the data 306 with the transceiver 810 and the associated transceiver network 830 that routes communications directly to the shared, interconnected network 720. Regardless of the communications device communicating with the personal digital gateway 100, the data may need to be configured and/or otherwise formatted for the receiving communications device (including audio, text (e.g., ASCII), video, other digital formats, and combination thereof). Thus, the PDG Rule-Based Application DataSever has the intelligence to identify configurations and formats of remote and/or linked data and to initiate the Edge Side Assembler to integrate the data (including remote and/or linked) for presentation by the communications device.

Figure 9:
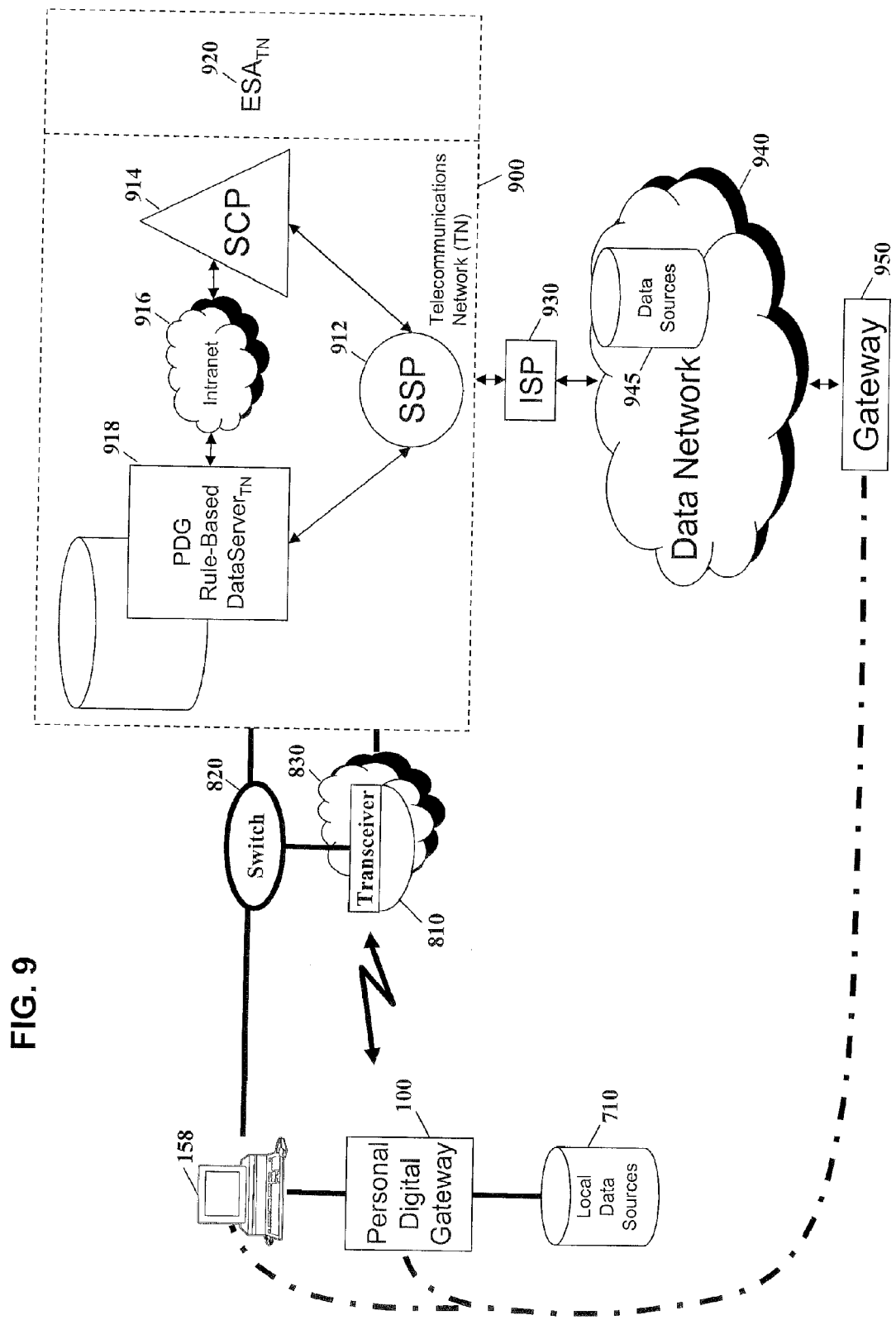
FIG. 9 is a schematic showing another exemplary embodiment of a PDG, a wired communications device, and an associated telecommunications network communicating data according to an embodiment of this invention.

FIG. 8 illustrates a virtual personalized network similar to FIG. 7; however, the shared, interconnected network is a telecommunications network 900 and with network-based information systems to interpret and communicate data back to the PC 158 or back to the personal digital gateway 100 (or back to another communications device connected with the personal digital gateway (not shown)). The system of FIG. 9 includes the personal digital gateway 100 coupled with the local data storage device 710, the PC 158, switch 820, telecommunications network 900 including a service switching point (SSP) 912, a service control point (SCP) 914, an Intranet 916, a $PDG_{TN}$ Rule-Based Application DataSever 918, and an Edge Side Assembler of the telecommunications network ($ESA_{TN}$) 920, an Internet Service Provider (e.g., BellSouth® Network or America On-Line®) 930, a data network 940, a remote data source 945, and a gateway 950. The switch 820 allows the connected PC 158 to communicate data 306 including a request for remote and/or linked data 306 via the telecommunications network 900 to a telecommunications facility, such as, for example, a central office (CO), a mobile telephone switching office (MTSO), and/or a combination CO/MTSO. The telecommunications network 900 may use any means of coupling the switch 820, but the coupling means is preferably high-capacity, high-bandwidth optical transport services, Gigabit Ethernet services, and/or the like. As those of ordinary skill in the art of telecommunications understand, the telecommunications network 900 could also link each switch 820 via other appropriate means, such as, for example a Synchronous Optical Network (SONET) structure with redundant, multiple rings.

Typically, the user connects the personal digital gateway 100 to the PC 158 to gain access to the telecommunications network 900. For example, if a user wishes to access voice, video, and/or other data available through the telecommunications network 900, then the personal digital gateway 100 connects with the PC 158 to the telecommunications network 900 via switch 820. The data and request for remote and/or linked data is routed through the telecommunications network 900 via switch 820. Communications signals associated with the address of the remote and/or linked data arrive at SSP 912 that analyzes the signals and determines whether the remote and/or linked data is addressed within the $PDG_{TN}$ Rule-Based Application DataSever 918 or addressed to an external, connected network, such as the data network 940. To facilitate the data connection through ISP 930, the PC 158 typically uses Internet browsing software (or other appropriate software to manage the data connection), such as, for example, MICROSOFT EXPLORER® or NETSCAPE NAVIGATOR®.

Depending on the address and content of the requested data, the SSP 912 may route the request immediately over the telecommunications network 900 to the ISP 930 to the data network 940 or the SSP 912 may communicate with SCP 914 for further processing and routing information (including eventual routing to the $PDG_{TN}$ Rule-Based Application DataServer 918 and to the $ESA_{TN}$ 920 if the user subscribes to a telecommunications based personal digital gateway service). Further, the $ESA_{TN}$ 920 of the telecommunications network 900 functions similarly to the Edge Side Assembler 314 (of the personal digital gateway) in that the $ESA_{TN}$ 920 facilitates an information-exchange of standardized or otherwise compatible data so that the data (including the remote and/or linked data) is integrated, configured, and/or otherwise formatted for presentation by the connected communications device.

In order to gain access to the data network 940, a query that is made for dynamic IP addressing. Some Internet Service Providers assign a "static" IP address to the user's account, whereas other Internet Service Providers dynamically change a customer's IP address. A static IP address is permanently assigned to the user, while a dynamic IP address may change with each login or may dynamically change during a session. In an embodiment, the IP address query is sent from the $PDG_{TN}$ Rule-Based Application DataServer 918 of telecommunications network 900. Regardless of how the IP address is accessed, the IP address is returned and communicated to the telecommunications network 900 so that switch 820 can communicate the data 306 (including remote and/or linked data) to/from the PC 158 via the IP address. Alternatively, the gateway 950 of the data network 940 could communicate the data to/from the PC 158 via the IP address (and thus, the data would not necessarily be routed back through the telecommunications network 900).

The telecommunications network 900 may include wired, optical, and/or wireless elements and may further include private network elements, such as private branch exchanges (PBXs), and/or other elements (not shown). The telecommunications network 900 includes Advanced Intelligent Network (AIN) componentry controlling many features of the network. The telecommunications network 900 or switch 820 could also include a packet-based "soft switch" that uses software control to provide voice, video, and/or data services by dynamically changing its connection data rates and protocols types. If the telecommunications network 900 or switch 820 should include a softswitch, the AIN componentry is replaced by an application server that interfaces with the softswitch via a packet protocol, such as Session Initiation Protocol (SIP). The signaling between the personal digital gateway 100, the PC 158, the switch 820, the telecommunications network 900 including AIN componentry, the data network 940, and the gateway 850, however, are well understood in by those of ordinary skill the art and will not be further described. Further, those of ordinary skill in the art will be able to apply the principles of this invention to their own legacy systems including their network configurations which may differ substantially from the telecommunications system shown in the figures.

Figure 10:
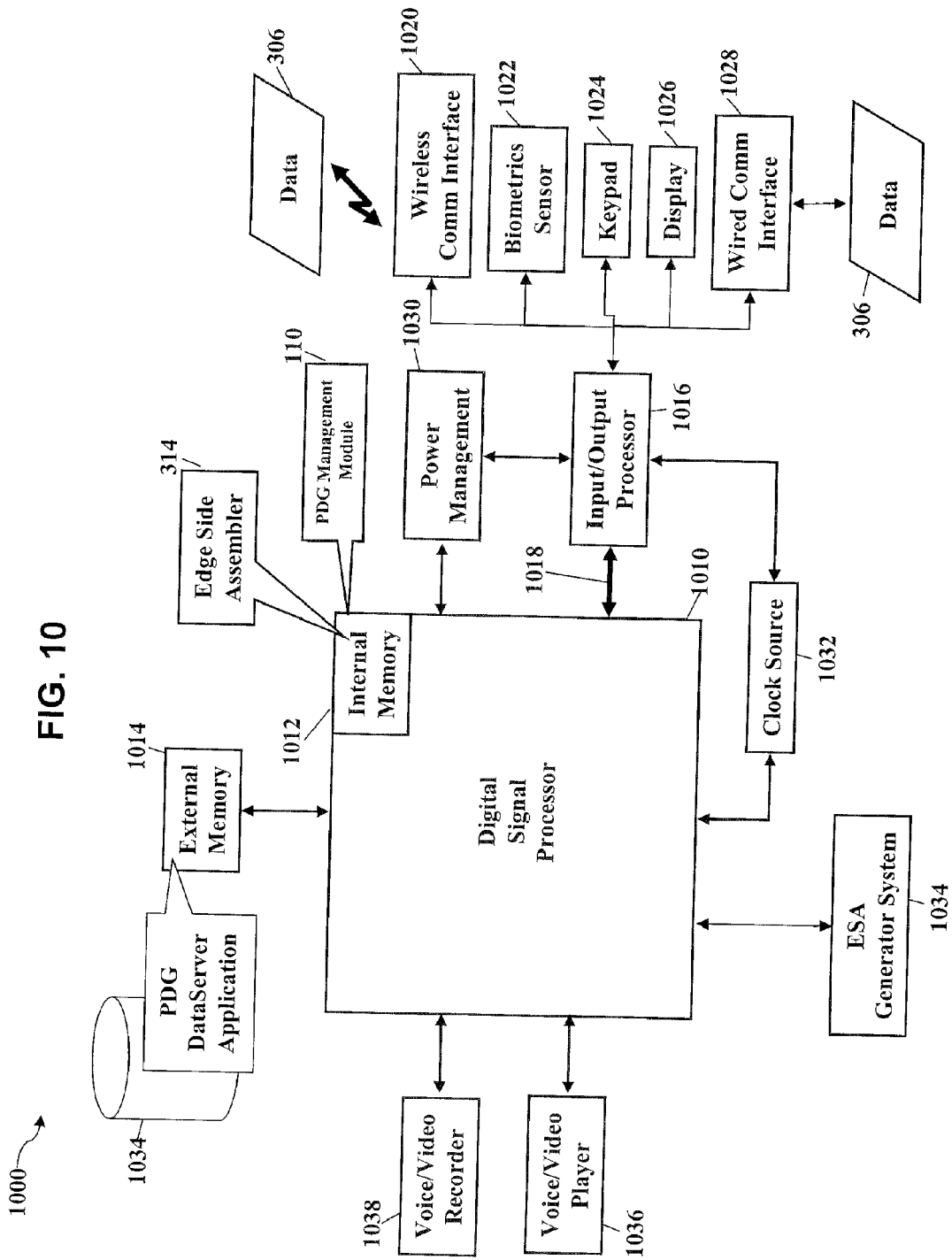
FIG. 10 is a block diagram of another exemplary PDG according to an embodiment of this invention.

FIG. 10 is a block diagram of another personal digital gateway 1000 embodying this invention. This apparatus allows an Edge Side Assembler 314 to generate or otherwise integrate and/or configure data 306 (including remote and/or linked data) for presentation by a connected communications device. The personal digital gateway 1000 includes the PDG Management Module 110 operating within a memory device of a digital signal processor 1010. The memory device could include internal memory 1012 of the digital signal processor 1010, or the memory device could include an external memory 1014 communicating with the digital signal processor 1010. The digital signal processor 1010 converts analog signals to digital signals and converts digital signals to analog signals. The digital signal processor 1010 could include compression and decompression algorithms, cancellation algorithms, audio-processing circuitry, filter circuitry, and amplifier circuitry. Although digital signal processors can be designed to provide differing capabilities and a variety of performance criteria, the basic functions of the digital signal processor are known and, thus, will not be further discussed.

The digital signal processor 1010 interfaces with an input/output processor 1016. The input/output processor 1016 controls system input/output and provides telephony and/or computer control features. A bus 1018 provides a signal communication path between the digital signal processor 1010 and the input/output processor 1016. The input/output processor 1016 is a microprocessor that includes memory (not shown), communication controllers (not shown), and peripheral controllers (not shown). The communication controllers, for example, could control packet-based communications with the connected communications device and a connected network through a wireless transceiver 1020 or through a wired communications port 1028. The communication controllers could also control packet-based communications with a communications switch (shown as reference numeral 820 in FIGS. 8-9). The peripheral controllers provide an interface with an LCD/LED/CRT display 1026 and with telephony/computer-like control features, such as a keypad 1024. Additionally, the peripheral controllers provide an interface with a biometrics sensor 1022, such as, for example, a fingerprint ID device. The biometrics sensor 1022 may provide security features that prevent unauthorized users from exploiting personal digital gateway 1000. The biometrics sensor 1072 could also comprise retina recognition device and software, DNA/RNA recognition device and software, facial recognition device and software, speech recognition device and software, and/or scent recognition device and software.

The digital signal processor 1000 also interfaces with an external voice/video player system 1036 and/or with a voice/video recorder system 1038 to audibly and/or visually communicate data. Further, a clock source 1032 provides a system clock for the apparatus 1000, and the clock source 1032 may also include higher and lower frequency multiples of the system clock depending upon power requirements and power availability. Still further, a power management system 1030 provides differing power control mechanisms, such as a sleep mode and a low-power mode, to efficiently utilize available power and to reduce thermal management concerns.

The personal digital gateway 1000 access, integrates, configures, and/or otherwise generates the data 306 for presentation to the connected communications device. If, for example, the personal digital gateway 1000 communicates with a PDA (shown as reference numeral 151 in FIG. 7), the PDG Management Module 110 may appear on the display 1004 and/or otherwise cause the personal digital gateway 1000 to visually or audibly alert the user of the connection with the PDA. Thereafter, the wireless communications interface 1020 (or alternatively the wired communications interface 1028) communicates the data 306 via a communications link to the PDA 151. The data 306 may include information associated with the PDG Rule-Based Profile 304. When the data 306 is communicated, the digital signal processor 1010 interfaces with the PDG Management Module 110 and with the internal memory 1012 and/or the external memory 1014. The PDG Management Module 110 instructs the digital signal processor 1010 to initiate the Edge Side Assembler 314 to access, integrate, configure, and/or otherwise process the data 306 stored in the memory device and the data received from remote and/or linked sources. Once the data is accessed and retrieved (if remote and/or linked data), the personal digital gateway 1000 generates and/or otherwise integrates the data for communication with the connected communications device. The digital signal processor 1010 interfaces with an Edge Side Assembler (ESA) Generator System 1034. The ESA Generator System 1034 executes the presentation format for the connected communications device, populates associated fields and/or files, and presents the data 306.

While several exemplary implementations of embodiments of this invention are described herein, various modifications and alternate embodiments will occur to those of ordinary skill in the art. Accordingly, this invention is intended to include those other variations, modifications, and alternate embodiments that adhere to the spirit and scope of this invention.

What is claimed is:

1. A method, comprising:
   selecting a selected communications device from a plurality of communications devices associated with a user;
   receiving data for communication between a personal digital gateway and the selected communications device;
   storing profiles for each of the plurality of communications devices;
   retrieving a profile associated with the selected communications device;
   interpreting the data for communication according to a rule-based engine;
   processing the data for communication according to an edge side assembler; and sending the data for communication and the profile from the personal digital gateway to the selected communications device.

2. The method of claim 1, further comprising configuring the data for communication for a presentation format that is compatible for the selected communications device.

3. The method of claim 1, further comprising storing a user interface in memory of the personal digital gateway.

4. The method of claim 1, further comprising storing a configuration agent that provides a listing of the plurality of the communications devices.

5. The method of claim 4, further comprising modifying the profiles that correspond to each of the plurality of the communications devices.

6. The method of claim 1, further comprising storing a collection of bookmarks in the profile, each bookmark having a date stamp that indicates a specific version of the data for communication.

7. The method of claim 1, further comprising splitting a display screen of the selected communications device into a first viewing area that displays management controls and into a second viewing area that displays the data for communication sent from the personal digital gateway.

8. The method of claim 1, further comprising storing authentication information associated with the selected communications device.

9. The method of claim 1, further comprising storing presentation formats associated with each of the plurality of the communications devices.

10. The method of claim 1, further comprising storing a display size for each of the plurality of the communications devices.

11. The method of claim 1, further comprising storing a timing sequence to automatically refresh a linked site for each of the plurality of the communications devices.

12. The method of claim 1, further comprising storing a networking capability for each of the plurality of the communications devices.

13. The method of claim 1, further comprising receiving an updated file from a co-author.

14. The method of claim 13, further comprising sending a message to inform other co-authors of the updated file.

15. The method of claim 13, further comprising:
storing routing instructions for sending messages to other co-authors; and
automatically sending the messages to inform each co-author of the updated file.

16. The method according to claim 1, further comprising:
automatically detecting when a file is uploaded to the personal digital gateway from any of the plurality of communications devices; and
sending a message to a list of contacts querying whether any of the contacts would like to receive a copy of the file.

17. The method according to claim 1, further comprising charging a fee when the copy of the file is downloaded.

18. The method according to claim 1, further comprising associating the profile to the selected communications device.

19. A system, comprising:
a processor executing software stored in memory that causes the processor to:
select a selected communications device from a plurality of the communications devices associated with a user;
receive data for communication between a personal digital gateway and the selected communications device;
store profiles for each communications device of the plurality of communications devices;
retrieve a profile associated with the selected communications device;
interpret the data according to a rule-based engine;
process the data by an edge side assembler; and
send the data and the profile from the personal digital gateway to the selected communications device.

20. A non-transitory computer readable medium storing processor executable instructions for performing a method, the method comprising:
selecting a selected communications device from a plurality of communications devices associated with a user;
receiving data for communication between a personal digital gateway and the selected communications device;
storing profiles for each of the plurality of communications devices;
retrieving a profile associated with the selected communications device;
interpreting the data for communication according to a rule-based engine;
processing the data for communication according to an edge side assembler; and
sending the data for communication and the profile from the personal digital gateway to the selected communications device.

* * * * *